(12) United States Patent  (10) Patent No.: US 7,498,687 B2
Kinsey et al.  (45) Date of Patent: *Mar. 3, 2009

(54) POWER SUPPLY CONTROL SYSTEM FOR A VEHICLE TRAILER

(75) Inventors: Gregory William Kinsey, Culver City, CA (US); John D. Jacob, Brea, CA (US)

(73) Assignee: R.A. Phillips Industries, Inc., Sante Fe Springs, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/601,470

(22) Filed: Nov. 17, 2006

(65) Prior Publication Data

US 2007/0152502 A1 Jul. 5, 2007

Related U.S. Application Data

(60) Provisional application No. 60/737,916, filed on Nov. 18, 2005.

(51) Int. Cl.
*B60L 1/00* (2006.01)
*H02J 1/00* (2006.01)

(52) U.S. Cl. ........................................ 307/10.1; 307/38
(58) Field of Classification Search ................ 307/10.1, 307/9.1, 30, 38
See application file for complete search history.

(56) References Cited

U.S. PATENT DOCUMENTS

| 5,416,702 | A | * | 5/1995 | Kitagawa et al. | ............... 701/36 |
| 5,604,439 | A | * | 2/1997 | Walkington et al. | ......... 324/504 |
| 5,739,592 | A | | 4/1998 | Rigsby et al. | |
| 5,929,532 | A | * | 7/1999 | Sell | ............................ 307/9.1 |
| 7,286,046 | B2 | * | 10/2007 | Kinsey et al. | ................ 340/431 |
| 2001/0030468 | A1 | * | 10/2001 | Anderson et al. | ............. 307/31 |
| 2008/0018439 | A1 | * | 1/2008 | Kinsey et al. | ................ 340/431 |

* cited by examiner

*Primary Examiner*—Stephen W Jackson
*Assistant Examiner*—Michael Rutland Wallis
(74) *Attorney, Agent, or Firm*—Jones Day (57) ABSTRACT

A controller is usable with a tractor that has a power supply and a trailer that has first and second auxiliary devices. The controller is configured to selectively enable and disable each of the auxiliary devices based on a predetermined set of device disabling conditions wherein: When any of the device disabling conditions occurs, then both auxiliary devices are disabled. When none of the device disabling conditions occurs then, when a first device-selecting condition occurs then the first auxiliary device is enabled and the second auxiliary device is disabled. And when a second device-selecting condition occurs then the second auxiliary device is enabled and the first auxiliary device is disabled.

27 Claims, 9 Drawing Sheets

POWER SUPPLY CONTROL SYSTEM FOR A VEHICLE TRAILER

CROSS-REFERENCE TO RELATED APPLICATION

This application claims the benefit of U.S. Provisional Application No. 60/737,916, filed Nov. 18, 2005, which is incorporated herein by reference in its entirety.

TECHNICAL FIELD

The application relates to systems for providing electrical power to trailers.

BACKGROUND

A tractor trailer rig includes two vehicles—a tractor in a driver sits, and a trailer pulled by the tractor. The tractor has a power supply that includes a battery and an alternator. The supply can be used to power dome lights in the trailer and to charge a lift-gate battery in the trailer.

SUMMARY

A controller is usable with a tractor that has a power supply and a trailer that has first and second auxiliary devices. The controller is configured to selectively enable and disable each of the auxiliary devices based on a predetermined set of device disabling conditions wherein: When any of the device disabling conditions occurs, then both auxiliary devices are disabled. When none of the device disabling conditions occurs then, when a first device-selecting condition occurs then the first auxiliary device is enabled and the second auxiliary device is disabled. And when a second device-selecting condition occurs then the second auxiliary device is enabled and the first auxiliary device is disabled.

In one example, the auxiliary devices can include a dome light of the trailer and a charger for recharging a battery of the trailer. The device disabling conditions include the application of a brake of the tractor, a time period not having lapsed, vehicle speed of the tractor exceeding a threshold speed, a first voltage of the power supply being below a threshold voltage, and/or amperage drawn from the power supply exceeding a threshold amperage. A device can warn a user when the amperage is below a second threshold amperage below the first threshold amperage. Another device can warn a user when the voltage is below a second threshold voltage above the first threshold voltage. The time period can be initiated when a brake of the tractor is released.

In another example, the first device-selecting condition is a user switch being in an on setting. The second device-selecting condition is a user switch being in an off setting. The controller enables each auxiliary device by electrically powering the device from the power supply. Alternatively, both auxiliary device are directly coupled to the power supply, and the controller enables and disables each auxiliary device by sending control signals to the auxiliary device.

DETAILED DESCRIPTION

The drawings and the following description include examples of the elements recited in the claims. These examples enable a person of ordinary skill in the art to make and use the invention, including best mode, without imposing limitations not recited in the claims.

FIRST EXAMPLE

Figure 1:
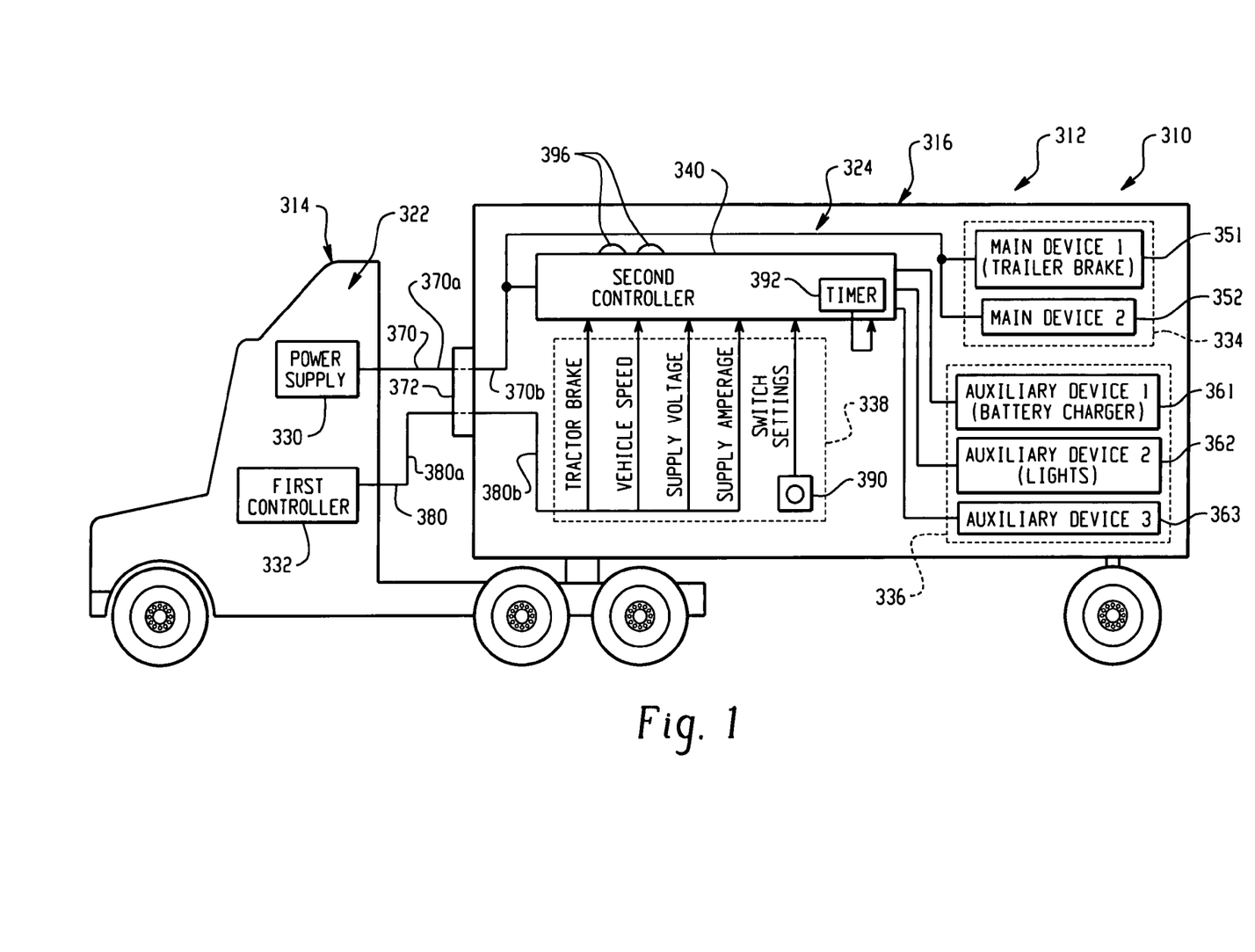
FIG. 1 is a schematic drawing of an electrical system for a tractor trailer.

FIG. 1 is a schematic view of an example electrical system 310 for a tractor trailer 312 that includes a tractor 314 and a trailer 316. The electrical system 310 includes a tractor-based electrical subsystem 322 and a trailer-based electrical subsystem 324. The tractor-based subsystem 322 includes a power supply 330 and a first controller 332. The trailer subsystem 324 includes main devices 334 and auxiliary devices 336, all powered by the tractor's power supply 330. The trailer subsystem 324 further includes a second controller 340 that distributes electricity to the auxiliary devices 336 based on various input signals 338 and internally determined parameters.

The tractor's power supply 330 typically includes the tractor's battery and alternator. The first controller 332 monitors and controls the tractor subsystem 322. For example, the first controller 332 monitors the tractor's brake system and vehicle speed and also measures the voltage level and amperage use of the tractor's power supply 330.

The main devices 334 in the trailer 316 are not controlled by or powered from the second controller 340. A first main device 351 is exemplified by the trailer's ABS brake system. Other main devices are possible, as portrayed by a second main device 352.

The auxiliary devices 336 are typically not as critical as the main devices 334. They are therefore configured to be disabled by the controller 340 when electrical power needs to be conserved, such as when the main devices are consuming the power or when the power supply 330 is in an under-voltage or over-current condition. A first auxiliary device 361 is exemplified by a trailer dome light. A second auxiliary device 362 is exemplified by a battery charger that uses power from the tractor's power supply 330 to recharge a lift-gate battery in the trailer 316. The charger can include a DC-DC converter that converts the voltage of the tractor's power supply 330 to a voltage matching the trailer's battery. Other auxiliary devices are possible, as portrayed by a third auxiliary device 363.

A power line 370 conducts electric power from the power supply 330 to the second controller 340 for distribution to the auxiliary devices 336. The power line 370 conducts electric power also to the main devices 334. The main devices 334 are thus powered independently from the second controller 340. The power line 370 includes a first section 370a extending from the tractor's power supply 330 to a junction box 372 of the trailer 316, and a second section 370b extending from the junction box 372 to the controller 340 and main devices 334 in the trailer 316.

A signal line 380 conducts control signals from the first controller 332 to the second controller 340. The line 380 can comprise a separate conductor for each signal as schematically portrayed in FIG. 1, or can comprise a single conductor that communicates all of the signals. Like the power line 370, the signal line 380 includes a first section 380a extending from the first controller 332 to the junction box 372, and a second section 380b extending from the junction box 372 to the second controller 340.

The second controller 340 can be connected to user interfaces, such as a toggle switch, rocker switch, or alphanumeric key pad. This is exemplified in FIG. 1 by a light switch 390 for turning on/off the trailer's dome lights.

The signal line 380 conducts several control signals from the first controller 332 to the second controller 340. A tractor brake signal indicates that the brake is being applied ("active") and can be derived from the tractor's brake light circuit. A vehicle speed signal is indicative of vehicle speed, such as by communicating the actual speed or simply indicating whether the speed is above a speed threshold. If the threshold is zero, the speed signal indicates whether the vehicle is moving. A voltage signal is indicative of the voltage level of the power supply 330, such as by communicating the actual voltage value or simply indicating whether the voltage is below a voltage threshold. An amperage signal is indicative the amperage being drawn from the power supply 330, such as by communicating the actual amperage value or by simply indicating whether the amperage exceeds a threshold level.

Some criteria can be determined by the second controller 340 itself. One example is an internal brake-release timer 392 that determines when a preset time period, starting when the tractor brake was last released, has lapsed. The timer 392 can initiate an internal time counter every time the tractor brake is released, and then "time out" when the counter has exceeded a time threshold.

In accordance with a control scheme, the second controller 340 distributes power to the auxiliary devices 336 based on the control signals received from first controller 332, the setting of the switch 390, and internally determined criteria.

In accordance with the control scheme, all auxiliary devices 361-363 are disabled, while all main devices 351, 352 remain enabled, when any predetermined auxiliary device disabling condition occurs. These device disabling conditions include the tractor brake being applied ("active"), the vehicle speed being above a threshold, the power supply voltage being below a threshold, the power supply amperage exceeding a threshold, and the brake-release time period not having lapsed.

When none of the aforementioned device disabling conditions occurs, the controller 340 can distribute power to the auxiliary devices 361-363 based on other conditions, specifically device-selecting conditions. An example device-selecting condition is the status of the light switch 390. When the light switch setting is "on", the second controller 340 powers the lights 361 and not the charger 362. When the light switch setting is "off", the second controller 340 powers the charger 362 and not the lights 361.

A third device-selecting condition can be based on lapsed time exceeding a threshold time period. For example, the timer 392 can be initiated when the light switch 390 is turned on and time out when the lapsed time exceeds a threshold. When the time threshold is exceeded, the controller 340 disables the dome light 361 and enables the charger 362 even if the light switch setting remains "on."

The second controller 340 can indicate electrical conditions to the user through a display, such indicator lights 396 or an alphanumeric display. For example, the display can indicate which auxiliary device 361, 362, 363 is currently active and consuming power. Or the indication can be a warning of the supply voltage falling below a threshold or the supply current exceeding a threshold. The voltage and current thresholds used for these displayed warnings can be the same as the voltage and current thresholds used for controlling the auxiliary devices 361-363.

One or more additional amperage thresholds can be used for indicating excessive amperage, with a different indication given for each threshold the amperage has exceeded. Similarly for other measured parameters, such as supply voltage, multiple thresholds can be used, with a different indication given for each additional threshold passed by the measured parameter. For example, the second controller 340 can activate a steady green light if the supply voltage is above an upper threshold, a steady red light when the voltage is between the upper and lower threshold, and a red flashing light when the voltage is below even the lower threshold. The lower threshold voltage can be the threshold used for the power control scheme.

In this example, the controller 340 enables/disables each auxiliary device 361, 362, 363 by opening/closing an internal relay, such as a solid state relay, that controls the supply current to the device. This typically requires the second controller 340 to control and distribute high current. In an alternative example, the auxiliary device 361, 362, 363 is directly coupled to the power line 70 to receive power directly from the power line 70, and the second controller 340 enables/disables the device 361, 362, 363 by sending a control signal to the device 361, 362, 363. This avoids the need for the controller 340 to control and distribute high electrical current.

A power control system in this example includes the two separate controllers 332 and 340—one in the tractor 314 and one in the trailer 316. Preferably, the power control functions are split between these two controllers 332 and 340 as explained above. However, in other examples, the power control functions can be allocated in other ways, and can even be performed by more than two or less than two controllers that can be located in the tractor 314 or in the trailer 316.

For example, preferably, the determination of which auxiliary devices to disable, using the control scheme, is performed by the trailer-based controller 340 as explained above. Alternatively, it can be performed by the tractor-based controller 332. Preferably, the comparison of the speed, voltage, amperage and lapsed time to the respective thresholds is performed by the second controller 340. Alternatively, it can be performed by the first controller 332 and the results communicated to the second controller 340.

The "tractor" is defined as a motor vehicle in which a driver sits, that is configured to pull a trailer, and the "trailer" is a vehicle that is pulled by the tractor. However, the system and method described above can apply also to other types of vehicles, and also to non-vehicle structures, such as a house having a power source and main and auxiliary devices.

OTHER EXAMPLES

Figure 2:
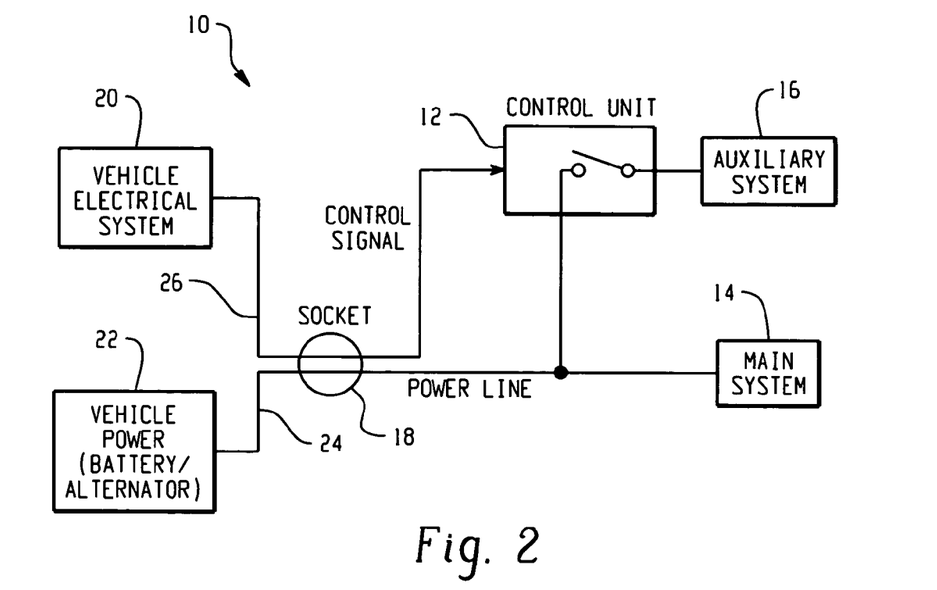
FIG. 2 is a block diagram of an example system for supplying power to a vehicle trailer.

FIG. 2 is a block diagram of an example system 10 for supplying power to a vehicle trailer. The system 10 includes a control unit 12, a main trailer electrical system 14, an auxiliary trailer electrical system 16 and a connection device 18. Also illustrated are a vehicle electrical system 20 and a vehicle power supply system 22.

The connection device 18 is configured to connect the vehicle trailer to a vehicle power line 24 from the vehicle power system 22 and to a control line 26 from the vehicle electrical system 20. The connection device 18 may, for example, be a SAE J560 socket in the junction box of a trailer, but could also be another suitable connection device. The vehicle power system 22 may, for example, include the alternator and battery in a tractor that generates around 14 VDC on the vehicle power line 24. The vehicle electrical system 20 may be an electrical system in a tractor and/or trailer that is configured to generate a control signal which is indicative of whether the tractor-trailer is currently in motion or will soon be in motion. For example, the vehicle electrical system 20 may include a brake light circuit that generates a brake light signal when the vehicle's brake pedal is depressed. In another example, the vehicle electrical system 20 may include a vehicle speed sensor that generates a control signal indicating the speed of the vehicle. In yet another example, the vehicle electrical system 20 may include all or part of the main trailer electrical system 14, for instance a control signal indicating the vehicle's current speed may be obtained from the trailer's ABS control module.

The main trailer electrical system 14 is coupled to the connection device 18 and receives power from the vehicle power line 24. The main trailer electrical system 14 may include one or more electrical systems in the trailer that require power when the trailer is in motion. For example, the main trailer electrical system 14 may include the trailer's ABS control module. The auxiliary trailer electrical system 16 may include one or more electrical systems in the trailer that only require power when the vehicle is not in motion, for example the trailer's interior cargo lights.

The control unit 12 is coupled to the connection device 18 and receives a control signal from the control line 26, and switchably couples the auxiliary trailer electrical system 16 to the vehicle power line 24 based on the control signal. The control unit 12 may disconnect power from the auxiliary trailer electrical system 16, allowing full power to the main trailer electrical system, when the control signal indicates that the trailer is in motion or is about to be in motion. The control unit 12 may, for example, include one or more relays or other controlled switching devices. In one example, the control unit 12 may also include a timing circuit that automatically disconnects power from the auxiliary trailer electrical system 16 after a timer period has expired.

If the vehicle electrical system 20 is a brake light circuit, then the control unit 12 may, for example, be configured to disconnect the auxiliary trailer electrical system 16 from the vehicle power line when the brake light signal is activated (e.g., when the driver depresses the brakes before putting the vehicle in gear). In another example, if the vehicle electrical system 20 includes a vehicle speed sensor, then the control unit 12 may be configured to disconnect the auxiliary trailer electrical system 16 from the vehicle power line when the control signal indicates that the vehicle is in motion (e.g., indicates a speed greater than zero).

Figure 3:
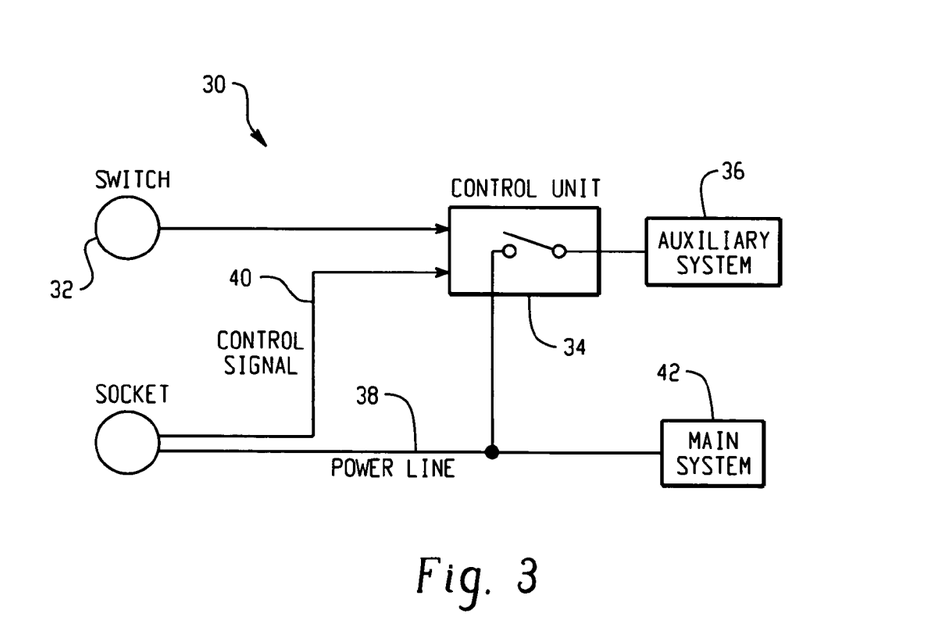
FIG. 3 is a block diagram of another example system for supplying power to a vehicle trailer.

FIG. 3 is a block diagram of another example system 30 for supplying power to a vehicle trailer. In this example, the system 30 also includes an auxiliary power switch 32 coupled to the control unit 34, and the control unit 34 is configured to switchably couple the auxiliary trailer electrical system 36 to the vehicle power line 38 based on both the control signal 40 and a signal from the auxiliary power switch 32. The auxiliary power switch 32 may be a momentary switch or a non-momentary switch. An example momentary switch may be activated by pressing the switch a first time and deactivated by pressing the switch a second time. An example non-momentary switch may be activated and deactivated by opening or closing the switch.

In operation, the control unit 34 connects the auxiliary trailer electrical system 36 to the vehicle power line 38 when the auxiliary power switch 32 is activated, provided that the control signal 40 does not indicate that the vehicle is in motion or is about to be in motion. The control unit 34 then disconnects the auxiliary trailer electrical system 36 from the vehicle power line 38, providing full power to the main trailer electrical system 42, if either the switch 32 is deactivated or the control signal 40 indicates that the vehicle is in motion or is about to be in motion.

For example, if the vehicle electrical system is a brake light circuit, then the control unit 34 may connect the auxiliary trailer electrical system 36 to the vehicle power line 38 when the switch 32 is activated, provided that the brake light signal 40 is not activated. The auxiliary trailer electrical system 36 is then disconnected from the power line 38 when either the switch 32 is deactivated or the brake light signal 40 is activated.

Figure 4:
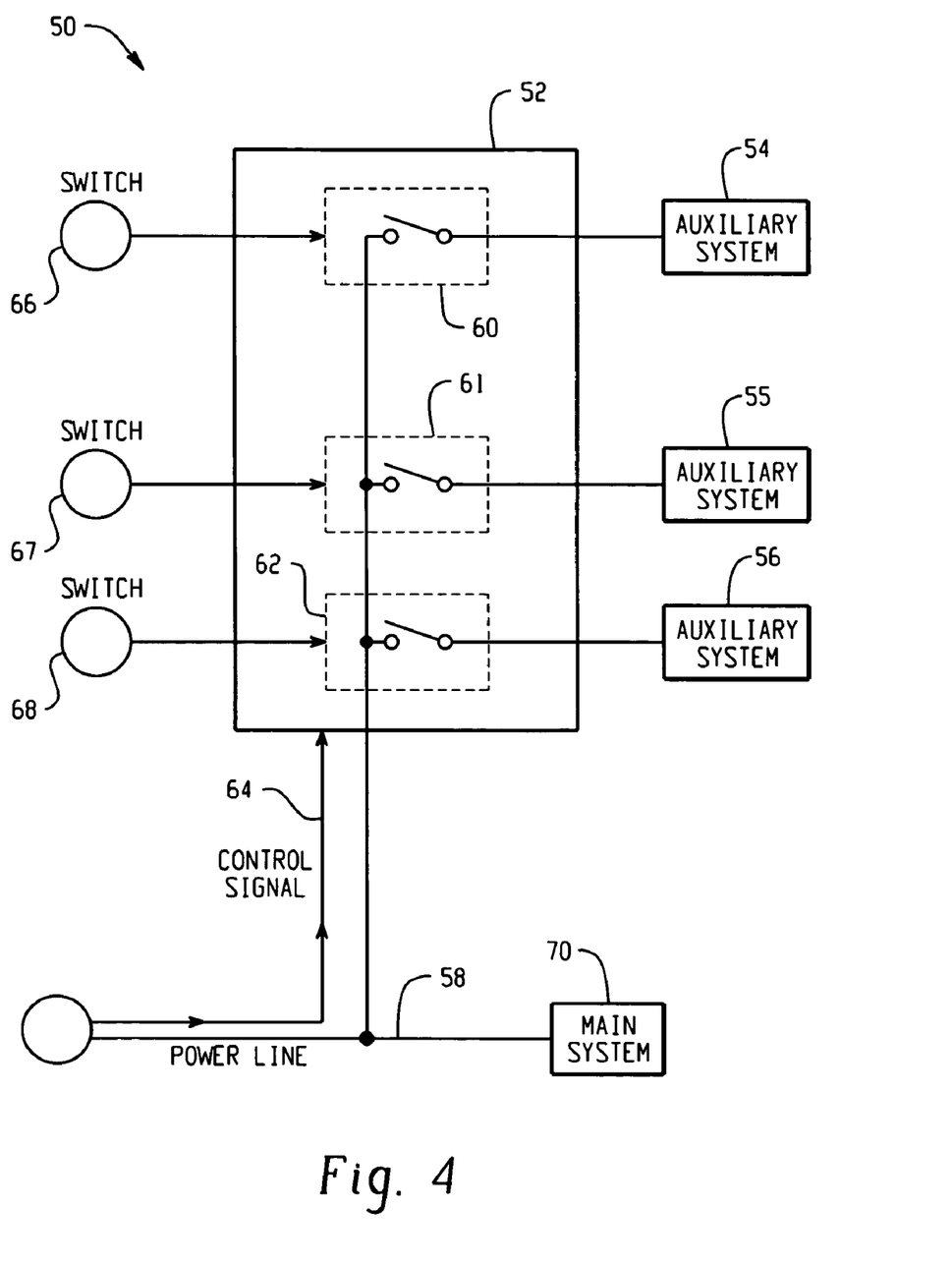
FIG. 4 is a block diagram of another example system for supplying power to a vehicle trailer.

FIG. 4 is a block diagram of another example system 50 for supplying power to a vehicle trailer. In this example, the control unit 52 switchably couples a plurality of auxiliary trailer electrical systems 54-56 to the vehicle power line 58. The control unit 52 includes a plurality of controlled switching devices 60-62 that each switchably couple one or the auxiliary trailer electrical systems 54-56 to the vehicle power line 58 based on both the control signal 64 and a signal from an auxiliary power switch 66-68. Each of the plurality of auxiliary trailer electrical systems 54-56 may be individually coupled to the vehicle power line 58 using a corresponding one of the auxiliary power switches 66-68, provided that the control signal 64 does not indicate that the vehicle is in motion or is about to be in motion. If the control signal 64 indicates that the vehicle is in motion or is about to be in motion, then the control unit 52 is configured to disconnect all of the auxiliary trailer electrical systems 54-56 from the vehicle power line 58, providing full power to the main trailer electrical system 70. The auxiliary trailer electrical systems 54-56 may also be manually disconnected from the vehicle power line 58 using the auxiliary power switches 66-68.

Figure 5:
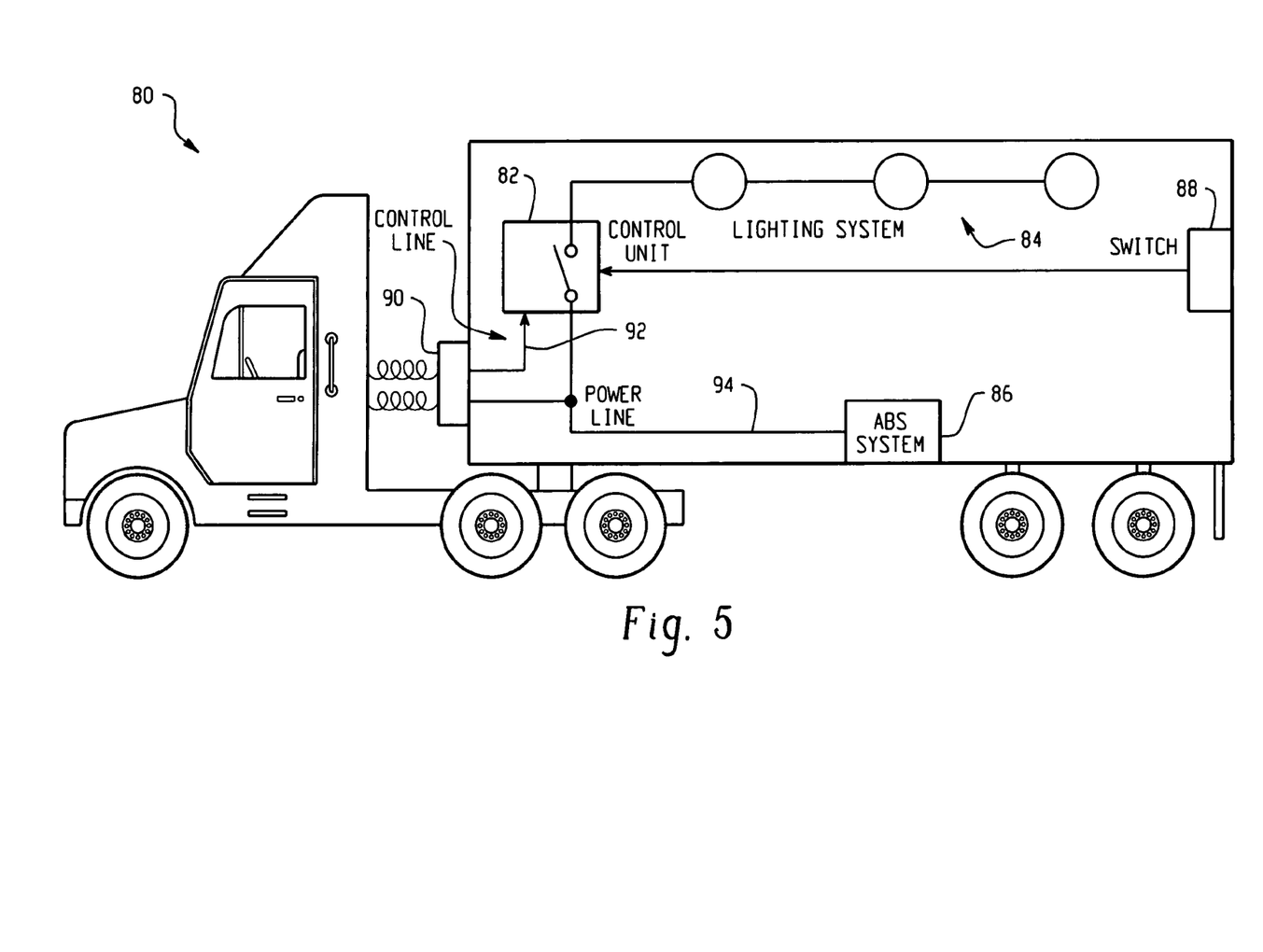
FIG. 5 depicts an example trailer having a power supply system.

FIG. 5 depicts an example trailer 80 having a power supply system, as described herein. In this example, the auxiliary trailer power system is a trailer lighting system 84 and the main trailer power system is an ABS control module 86. The trailer 80 includes a control unit 82, a lighting system 84, an ABS system 86, a switching circuit 88, and a connection device 90.

The connection device 90 is configured to connect the vehicle trailer to a vehicle power line 94 and a control line 92. The connection device 90 may, for example, be a SAE J560 socket attached to the junction box of the trailer. The ABS system 86 is coupled to the connection device 90, and receives power from the vehicle power line 94. The control unit 82 is coupled to the connection device 90 and the switching circuit 88, and switchably couples the lighting system 84 to the vehicle power line 94 based on both a control signal 92 and a signal from the switching circuit 88. The switching circuit 88 may, for example, be connected to the interior of the trailer, may be attached to the housing of the connection device 90, or may be positioned at another location on the trailer 80.

In operation, the control unit 82 connects the lighting system 84 to the vehicle power line 94 when the switching circuit 88 is activated, provided that the control signal 92 does not indicate that the vehicle is in motion or is about to be in motion. The control unit 82 then disconnects the lighting system 84 from the vehicle power line 94, providing full power to the ABS system 86, if either the switching circuit 88 is deactivated or the control signal 92 indicates that the vehicle is in motion or is about to be in motion. For example, if the control signal 92 is a brake light signal, then the control unit 82 may disconnect the lighting system 84 from the vehicle power line 94 when the brake light signal is activated.

In other examples, the control unit 82 may also include a timing circuit, a power line voltage monitoring circuit, and/or some other type of circuit that is configured to disconnect the lighting system 84 from the vehicle power line 94 based on some predetermined condition or occurrence (e.g., after a timer period has expired, if the power line voltage falls below a predetermined threshold level, etc.).

Figure 6:
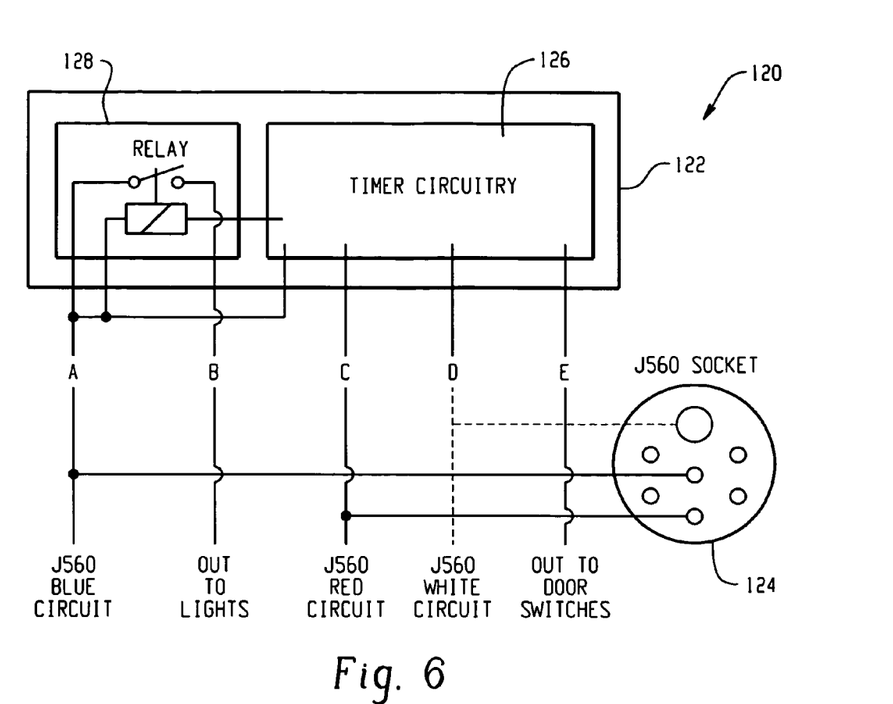
FIG. 6 depicts an example control unit and connection device for a system for supplying power to a vehicle trailer.

FIG. 6 depicts an example control unit 122 and connection device for a system for supplying power to a vehicle trailer. The control unit 122 includes a timer circuit 126, a controlled switching device 128 (e.g., a relay), and five input/output pins (labeled A-E). Also illustrated is a connection device 124, which, for example, may be a J560 socket, an ISO3731 socket, or other suitable connection device.

The switching device 128 is controlled by the timer circuitry 126, and switchably connects the auxiliary trailer electrical system (e.g., trailer lights) at pin B to the vehicle power line at pin A. As illustrated, the vehicle power line (pin A) may be the blue power wire on a standard J560 socket 124. The timer circuitry 126 receives a control signal at pin C and an auxiliary power switch signal at pin E. The control signal (pin C) may be received from the red brake light line on a standard J560 socket 124. The auxiliary power switch signal (pin E) may be received from one or more auxiliary power switches, for example located in the interior or the trailer and/or attached to the housing of the control unit 122. Pin D is a ground connection, for example from the white ground wire on a typical J560 socket 124.

In operation, the timer circuit 126 causes the switching device 128 to connect the auxiliary trailer electrical system (pin B) to the vehicle power line (pin A) when the auxiliary power switch (pin E) is activated. In addition, once the auxiliary power switch (pin E) is activated, the timer circuit 126 begins counting a preset timer period. The timer period for the timer circuitry 126 may, for example, be preset by the device manufacturer, be set by a user input (e.g., by selecting from variable timer settings), or be set by some other suitable means. The timer circuit 126 then causes the switching device 128 to disconnect the auxiliary trailer electrical system (pin B) from the vehicle power line (pin A) when either (1) the timer period expired, (2) the auxiliary power switch (pin E) is deactivated, or (3) a control signal (pin C) is received indicating that the vehicle is in motion or is about to be in motion (e.g., a brake light signal is received).

Figure 7:
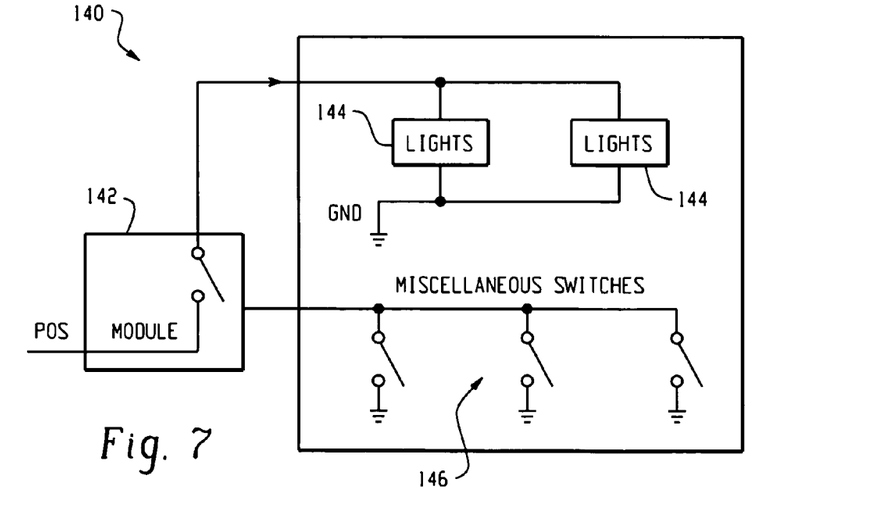
FIG. 7 depicts a circuit diagram illustrating one example switching configuration for a system for supplying power to a vehicle trailer.

FIG. 7 depicts a circuit diagram 140 illustrating one example switching configuration for a system for supplying power to a vehicle trailer. Shown in the diagram 140 are a control unit 142, a trailer lighting system 144, and auxiliary power switches 146. As illustrated, the interior cargo lights 144 may be coupled between a power output pin of the control unit 142 and a ground potential, and the auxiliary power switches 146 may be coupled between an input pin of the control unit 142 and a ground potential. The control unit 142 is operable to switchably couple the interior cargo lights 144 to a positive power line at its power input terminal. In another example, the interior cargo lights may instead be coupled between a positive power line and the control unit 142, and the control unit 142 may switchably connect the lights 144 to a ground potential.

Figure 8:
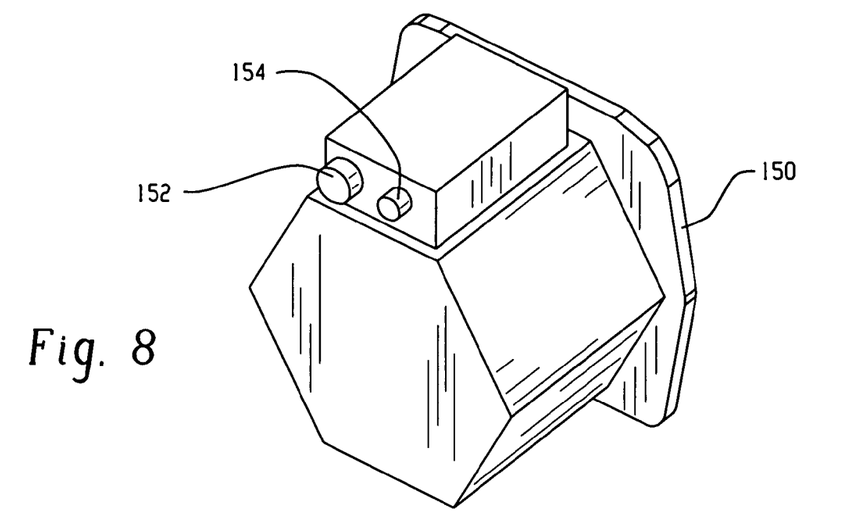
FIG. 8 depicts an example housing for a control unit.

FIG. 8 depicts an example housing 150 for a control unit. Mounted on the housing is an auxiliary power switch 152 and a power-on indicator light 154. The housing 150 may, for example, be overmolded in PVC or housed in a similar weatherproof enclosure, and includes a wire bundle for making connections to the control unit (e.g., inside a junction box).

Figure 9:
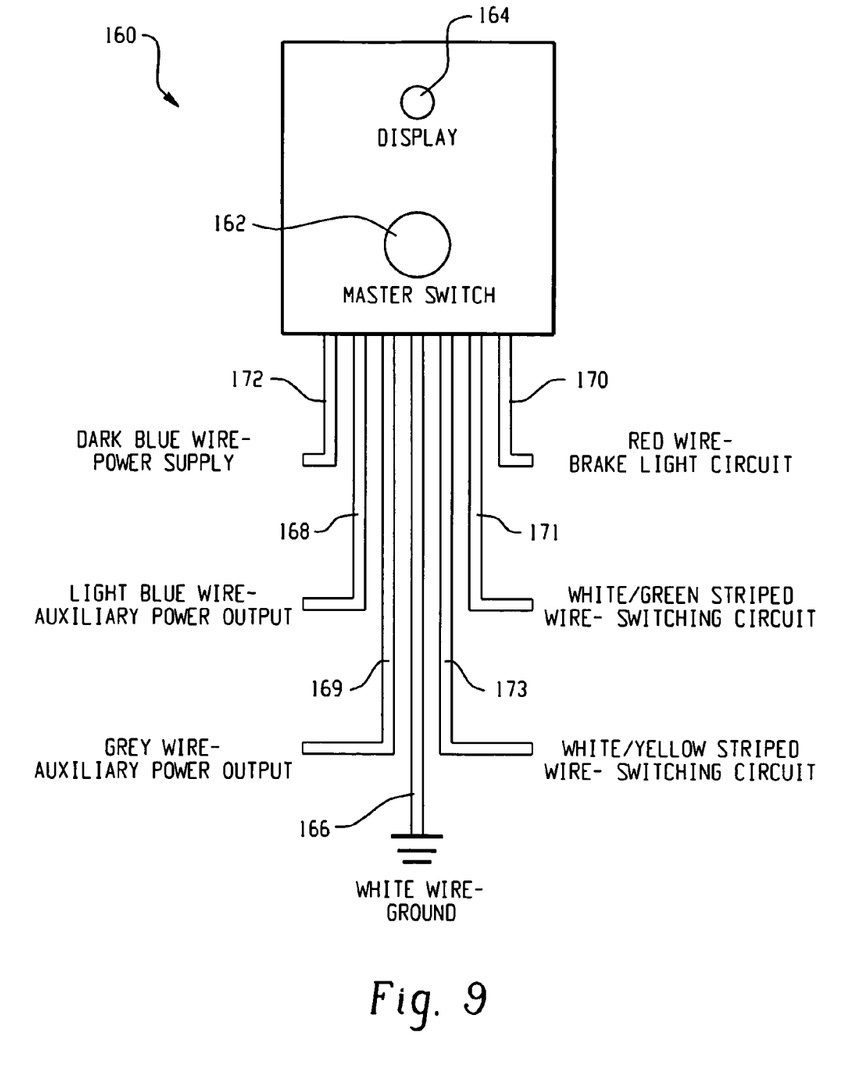
FIG. 9 is a schematic diagram of an example housing for a control unit.

FIG. 9 is a schematic diagram of an example housing for a control unit 160. The control unit 162 includes an auxiliary power switch 162 and a display 164 mounted on the housing. Also illustrated are seven wires 166, 168, 169, 170, 171, 172, 173 connected to the control unit 160. The wires may, for example, include a connection 172 (e.g., a dark blue wire) to the vehicle power line, a connection 170 (e.g., a red wire) to a brake light line, a ground connection 166 (e.g., a white wire), one or more auxiliary power outputs 168, 169 (e.g., a light blue and grey wire), and one or more connections 171, 173 (e.g., white/green and white/yellow striped wires) to auxiliary power switching circuits. The display 164 may, for example, be a power light that indicates whether one or more of the auxiliary power output lines 168, 169 are activated. In another example, the display 164 may provide additional information, such as a low voltage and/or high current warning indication.

Figure 10:
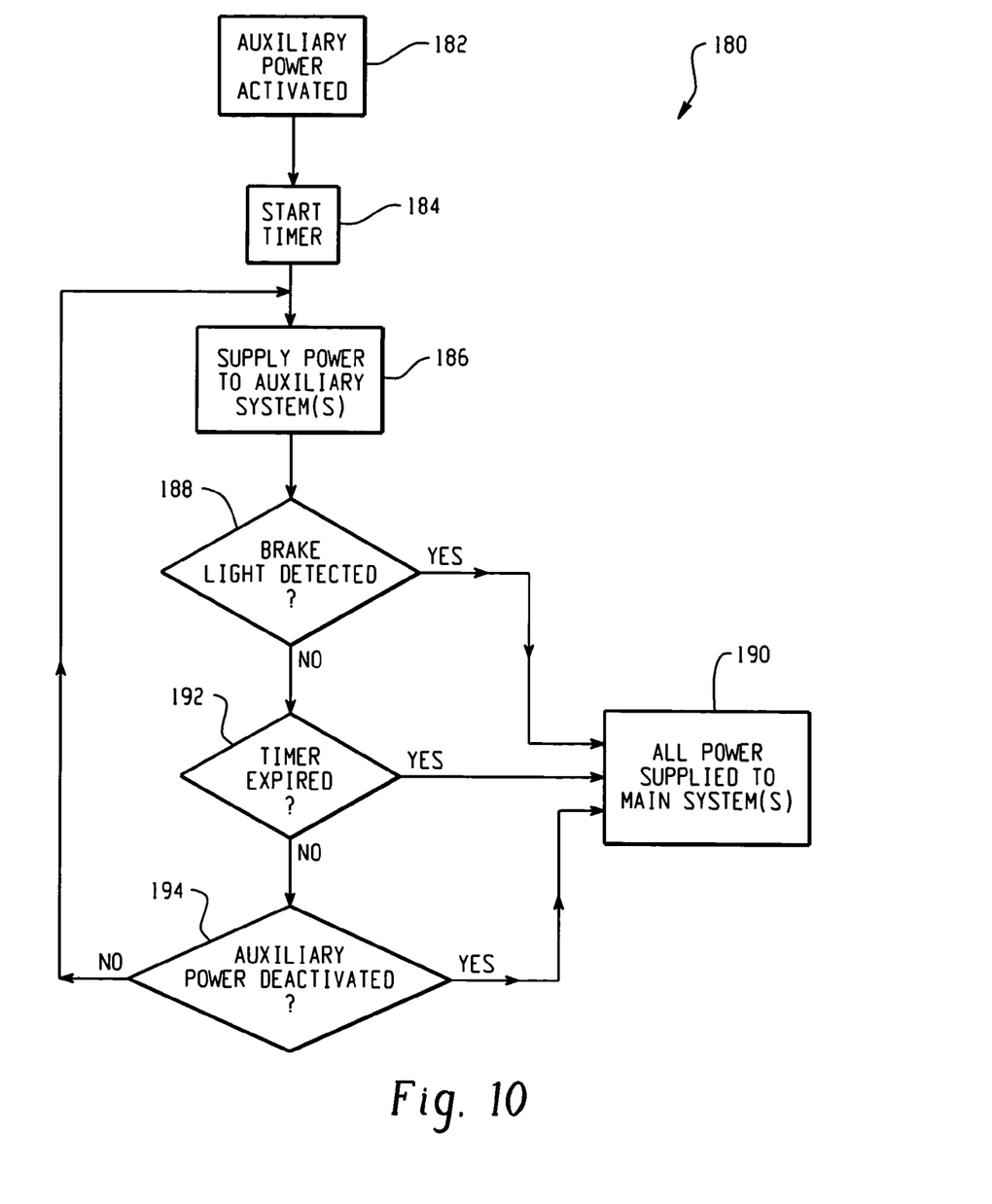
FIG. 10 is a flow diagram depicting an example method for supplying power to a vehicle trailer.

FIG. 10 is a flow diagram depicting an example method 180 for supplying power to a vehicle trailer. At step 182, auxiliary power is activated, for example by depressing a momentary switch or by closing or opening a non-momentary switch. Upon activating auxiliary power, the method begins counting a preset timer period. Then, in step 186, power is supplied to one or more auxiliary trailer electrical systems, such as interior cargo lights.

In step 188, the method determines if a brake light signal has been activated. If the brake light signal is detected, then the method proceeds to step 190. Otherwise, if no brake light signal is detected, then the method continues to step 192. In step 192, the method determines if the preset timer period has expired. If the timer period has expired, then the method proceeds to step 190. If the timer period has not expired, then the method continues to step 194. In step 194, the method determines if auxiliary power has been deactivated, for example by depressing a momentary switch or by closing or opening a non-momentary switch. If auxiliary power has been deactivated, then the method proceeds to step 190, else the method returns to step 186. In step 190, power is disconnected from the one or more auxiliary trailer electrical systems, causing full power to be supplied to one or more main trailer electrical systems.

It should be understood that similar to other processing flows described herein, one or more of the steps and the order in the flowchart may be altered, deleted, modified and/or augmented and still achieve the desired outcome.

Figure 11:
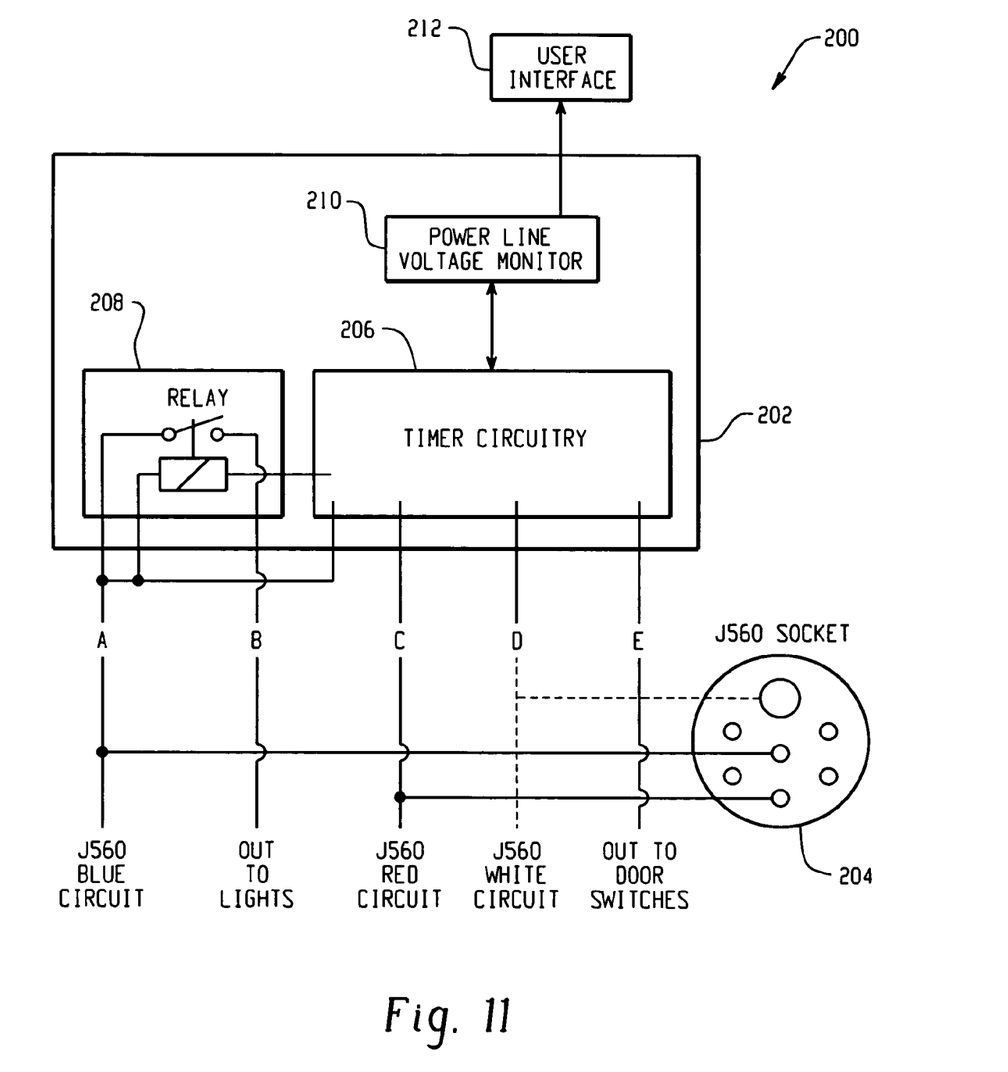
FIG. 11 depicts another example control unit.

FIG. 11 depicts another example control unit 202. In this example 200, the control unit 202 also includes a power line voltage monitor circuit 210 coupled to the time circuitry 206, which is configured to monitor the voltage level of the vehicle power line (pin A). Also illustrated is a user interface 212 for generating an output based on the measured voltage level.

In operation, the power line voltage monitor circuit 210 causes the timer circuitry 206 to disconnect the auxiliary trailer electrical system (pin B) from the vehicle power line (pin A) if the measured voltage on the vehicle power line (pin A) falls below a predetermined shut off voltage (e.g., 9.75 V). In addition, the power line voltage monitor circuit 210 may generate an output on the user interface 212 based on the state of the measured voltage. For example, if the measured voltage on the vehicle power line (pin A) is greater than or equal to the predetermined shut off voltage, then the user interface 212 may display a steady (e.g., constantly on) green light, and if the measured voltage is below the predetermined shut off voltage, then the user interface 212 may display a flashing red light.

In another example, the power line voltage monitor circuit 210 may also display a warning indicator on the user interface 212 if the measured voltage on the vehicle power line (pin A) falls below a predetermined warning voltage (e.g., 10 V). For example, the user interface 212 may display a steady green light if the measured voltage is greater than or equal to the warning voltage, display a steady red light if the measured voltage is less than the warning voltage and greater than or equal to the shut off voltage, and display a red flashing light if the measured voltage is less than the shut off voltage.

In yet another example, the power line voltage monitor circuit 210 may monitor the current in the vehicle power line (pin A) and cause the timer circuitry 206 to disconnect the auxiliary trailer electrical system (pin B) from the vehicle power line (pin A) if the measured current in the vehicle power line (pin A) is above a predetermined shut off current. In addition, the power line voltage monitor circuit 210 may display a first indicator (e.g., a green light) on the user interface 212 if the measured current is below the predetermined shut off current, and display a second indictor (e.g., a purple light) if the measured current is above the predetermined shut off current.

Figure 12:
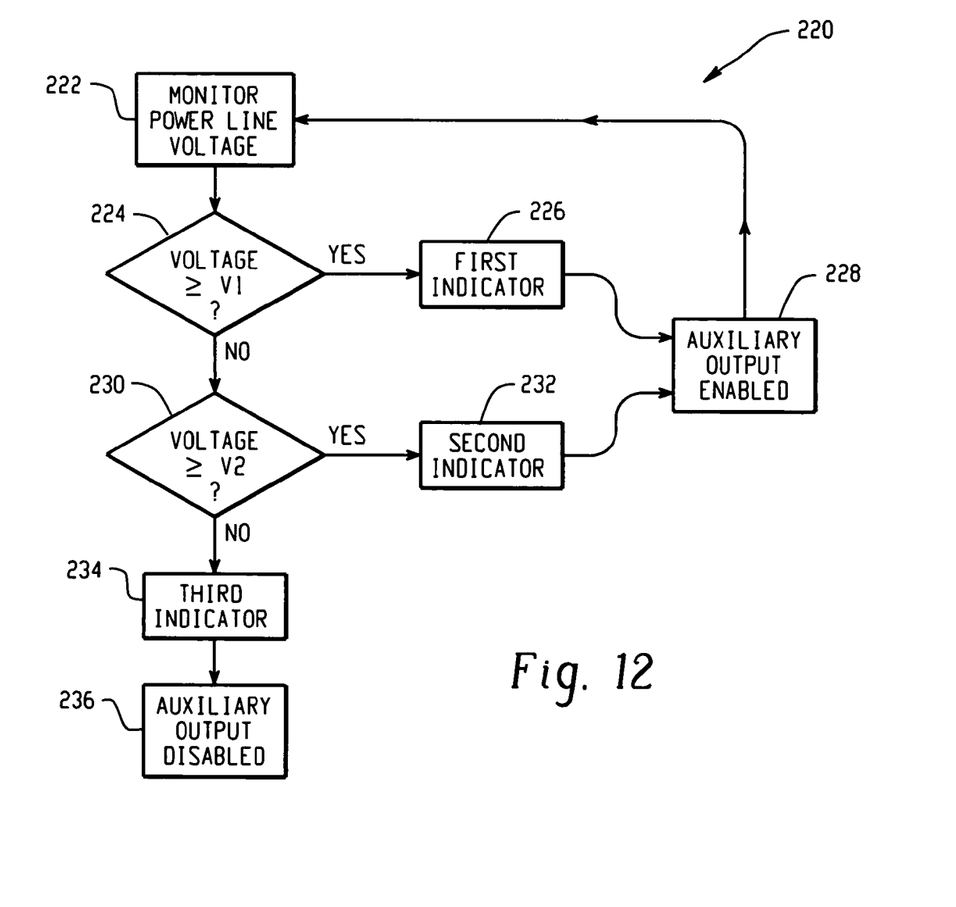
FIG. 12 is a flow diagram of an example method for controlling the auxiliary power in a vehicle trailer based on a measured voltage on the vehicle power line.

FIG. 12 is a flow diagram of an example method 220 for controlling the auxiliary power in a vehicle trailer based on a measured voltage on the vehicle power line. This illustrated method 220 may, for example, be used independently or in combination with one or more steps of the example method 180 depicted in FIG. 10.

In step 220, the voltage level on the vehicle power line is measured. The method 220 then determines at step 224 whether the measured voltage is greater than or equal to a first voltage threshold (V1). If the measured voltage is greater than or equal to the first voltage threshold (V1), then a first indicator is generated at step 226, the auxiliary power in enabled at step 228, and the method returns to step 222. For example, the first indicator displayed in step 226 may be a green light, or some other indication that the measured voltage is above a warning voltage level. Otherwise, if the measured voltage is less than the first voltage threshold (V1), then the method 220 proceeds to step 230.

In step 230, the method 220 determines whether the measured voltage is greater than or equal to a second voltage threshold (V2). If the measured voltage is greater than or equal to the second voltage threshold (V2), then a second indicator is generated at step 232, the auxiliary power in enabled at step 228, and the method returns to step 222. For example, the second indicator displayed in step 232 may be a steady red light, a yellow light, or some other indication that the measured voltage is between a warning voltage level and a shut off voltage level.

If the measured voltage is below the second voltage threshold (V2), then a third indicator is generated at step 234, and the auxiliary power is disabled at step 236. For example, the third indicator displayed at step 236 may be a flashing red light, or some other indication that the measured voltage is below a shut off voltage level.

The scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. An apparatus comprising:
a controller connected to a tractor and a trailer, the tractor having a power supply, and the trailer having first and second auxiliary devices and a brake that are powered by the tractor's power supply, the controller being configured to selectively enable and disable each of the auxiliary devices in order to reserve electricity for use by the trailer's brake, wherein:
when any of a predetermined set of device disabling conditions occurs then disabling both auxiliary devices, the disabling conditions including application of a brake of the tractor or exceeding a threshold speed; and
when none of the device disabling conditions occurs then:
when a first device-selecting condition occurs then enabling the first auxiliary device and disabling the second auxiliary device; and
when a second device-selecting condition occurs then enabling the second auxiliary device and disabling the first auxiliary device.

2. The apparatus of claim 1 wherein the first auxiliary device is a dome light of the trailer.

3. The apparatus of claim 1 wherein the second auxiliary device is a charger for recharging a battery of the trailer.

4. The apparatus of claim 1 wherein the device disabling conditions include the application of a brake of the tractor.

5. The apparatus of claim 4 wherein the controller is configured to be electrically connected to a brake system of the tractor to receive an indication of when the tractor's brake is applied.

6. The apparatus of claim 1 wherein the device disabling conditions include a time period not having lapsed.

7. The apparatus of claim 6 wherein the time period is initiated when a brake of the tractor is released.

8. The apparatus of claim 1 wherein the device disabling conditions include vehicle speed exceeding a threshold speed.

9. The apparatus of claim 8 wherein the threshold speed is zero.

10. The apparatus of claim 1 wherein the device disabling conditions include a voltage of the power supply being below a first threshold voltage.

11. The apparatus of claim 10 further comprising a device configured to warn a user when the voltage is below a second threshold voltage above the first threshold voltage.

12. The apparatus of claim 1 wherein the device disabling conditions include amperage drawn from the power supply exceeding a threshold amperage.

13. The apparatus of claim 12 further comprising a device configured to warn a user when the amperage is below a second threshold amperage below the first threshold amperage.

14. The apparatus of claim 1 wherein the first device-selecting condition is a user switch being in an on setting.

15. The apparatus of claim 1 wherein the second device-selecting condition is a user switch being in an off setting.

16. The apparatus of claim 1 wherein:
when none of the device disabling conditions occurs then:

when the first device-selecting condition and a time out condition concurrently occur then enabling the first auxiliary device and disabling the second auxiliary device; and when either the second device-selecting condition or the time out condition occurs then enabling the second auxiliary device and disabling the first auxiliary device.

17. The apparatus of claim 1 wherein the controller is configured to be installed in the trailer.

18. The apparatus of claim 1 wherein the controller is configured to enable each auxiliary device by electrically powering the device from the power supply, and to disable the auxiliary device by refraining from powering the device from the power supply.

19. The apparatus of claim 1 wherein the auxiliary devices are directly coupled to the power supply, and the controller enables or disables each auxiliary device by sending control signals to the auxiliary device.

20. The apparatus of claim 1 further comprising the tractor and the trailer, wherein the trailer further has a brake system that is configured to be powered by the power supply independently of the controller.

21. A method for use with a tractor and a trailer, the tractor having a power supply, and the trailer having first and second auxiliary devices and a brake that are powered by the tractor's power supply, for reserving electricity for use by the trailer's brake, the method comprising:

predetermining a set of device disabling conditions, the disabling conditions including application of a brake of the tractor or exceeding a threshold speed;

disabling both auxiliary devices when any of the device disabling conditions occurs;

enabling the first auxiliary device and disabling the second auxiliary device when both none of the device disabling conditions occurs and a first device-selecting condition occurs, and enabling the second auxiliary device and disabling the first auxiliary device when both none of the device disabling conditions occurs and a second device-selecting condition occurs.

22. The method of claim 21 wherein the power supply and the auxiliary devices are parts of a tractor trailer rig.

23. The method of claim 21 wherein the device disabling conditions include the application of a vehicle brake.

24. The method of claim 21 wherein the first device-selecting condition is a user switch being in an on setting, and the second device-selecting condition is the switch being in an off setting.

25. A device for use with a tractor and a trailer, the tractor having a power supply, and the trailer having first and second auxiliary devices and a brake that are powered by the tractor's power supply, for reserving electricity for use by the trailer's brake, comprising:

means for disabling both auxiliary devices when any of a set of predetermined device disabling conditions occurs, the disabling conditions including application of a brake of the tractor or exceeding a threshold speed;

means for enabling the first auxiliary device and disabling the second auxiliary device when both none of the device disabling conditions occurs and a first device-selecting condition occurs; and means for enabling the second auxiliary device and disabling the first auxiliary device when both none of the device disabling conditions occurs and a second device-selecting condition occurs.

26. An apparatus comprising:

a controller for a rig including a tractor and a trailer, the tractor having a power supply, and the trailer having first and second auxiliary devices and a brake that are powered by the tractor's power supply, the controller being configured to selectively enable and disable each of the auxiliary devices in order to reserve electricity for use by the trailer's brake, by the controller:

sensing when a disable condition, of vehicle speed exceeding a nonzero threshold speed, occurs; and disabling both auxiliary devices when the disable condition occurs; and when the disable condition does not occur:

enabling the first auxiliary device when a first device-selecting condition occurs; and enabling the second auxiliary device when a second device-selecting condition occurs.

27. The apparatus of claim 26, wherein the controller is further configured to disable the second auxiliary device when the first device-selecting condition occurs and to disable the first auxiliary device when the second device-selecting condition occurs.

* * * * *